(12) United States Patent
Castaldini et al.

(10) Patent No.: US 11,926,282 B2
(45) Date of Patent: Mar. 12, 2024

(54) SYSTEMS AND METHODS FOR RANDOM VEHICLE MOVEMENT FOR VEHICLE SAFETY

(71) Applicant: Ford Global Technologies, LLC, Dearborn, MI (US)

(72) Inventors: Matthew Castaldini, Wayne, MI (US); Naman Kohli, San Jose, CA (US); Vidhya Iyer, Sunnyvale, CA (US); Shounak Athavale, San Jose, CA (US); Sonal Doomra, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 17/202,595

(22) Filed: Mar. 16, 2021

(65) Prior Publication Data
US 2022/0297633 A1    Sep. 22, 2022

(51) Int. Cl.
| | |
|---|---|
| *G01C 22/00* | (2006.01) |
| *B60H 1/00* | (2006.01) |
| *B60R 25/04* | (2013.01) |
| *B60R 25/102* | (2013.01) |
| *B60S 1/08* | (2006.01) |
| *B60W 30/09* | (2012.01) |
| *B60W 50/032* | (2012.01) |
| *B60W 50/14* | (2020.01) |
| *G07C 5/02* | (2006.01) |

(52) U.S. Cl.
CPC ......... *B60R 25/04* (2013.01); *B60H 1/00878* (2013.01); *B60H 1/00985* (2013.01); *B60R 25/102* (2013.01); *B60S 1/08* (2013.01); *B60W 30/09* (2013.01); *B60W 50/032* (2013.01); *B60W 50/14* (2013.01); *G07C 5/02* (2013.01)

(58) Field of Classification Search
CPC ....................................................... G07C 5/02
See application file for complete search history.

(56) References Cited

U.S. PATENT DOCUMENTS

| | | | |
|---|---|---|---|
| 9,421,972 B2 | 8/2016 | Davidsson et al. | |
| 9,701,305 B2 | 7/2017 | Paul et al. | |
| 9,858,621 B1 | 1/2018 | Konrardy et al. | |
| 2017/0124476 A1* | 5/2017 | Levinson | G06V 20/58 |
| 2018/0130347 A1* | 5/2018 | Ricci | G08G 1/096775 |
| 2023/0068712 A1* | 3/2023 | Duan | B60W 40/12 |

OTHER PUBLICATIONS

William Hopkins, Your Smart Homes Managing Director, "Smart Home, Smart Car—What we'd love to do with Tesla!", https://yoursmarthome.co.uk/smart-home-smart-car, Sep. 12, 2020, 3 pages.

* cited by examiner

*Primary Examiner* — Adam M Alharbi
(74) *Attorney, Agent, or Firm* — Brandon Hicks; Eversheds Sutherland (US) LLP

(57) ABSTRACT

Systems and methods for random vehicle movement to prevent theft are disclosed. The vehicle system may automatically reposition to make it seem like the user is home and to reduce battery drain and flat spots on the tire. The system may randomize the start time based on the preferences of the user. At the randomly decided time, the vehicle may start up on its own and reposition itself. In addition, the system may learn a driving behavior pattern of the vehicle via machine learning based on driving behavior associated with the vehicle, such that the vehicle may perform vehicle movement based on the learned driving behavior pattern.

17 Claims, 9 Drawing Sheets

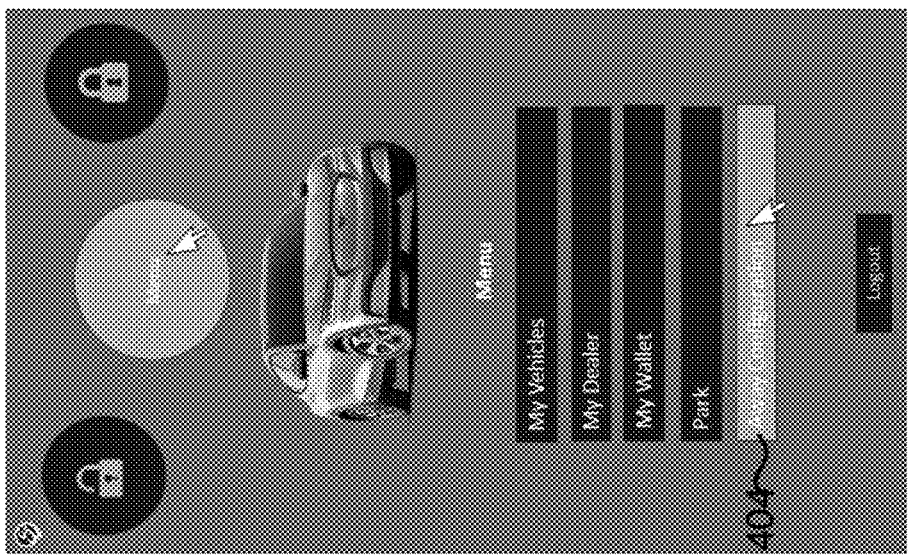
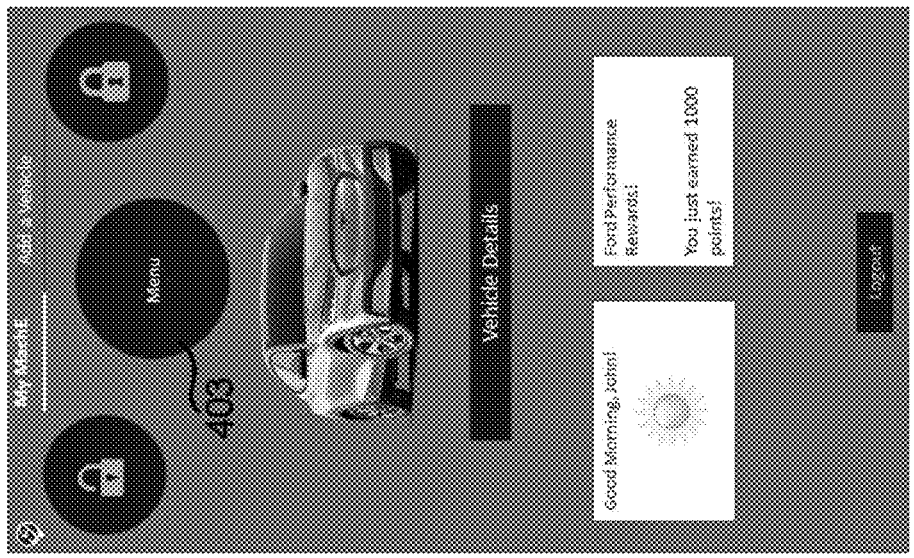
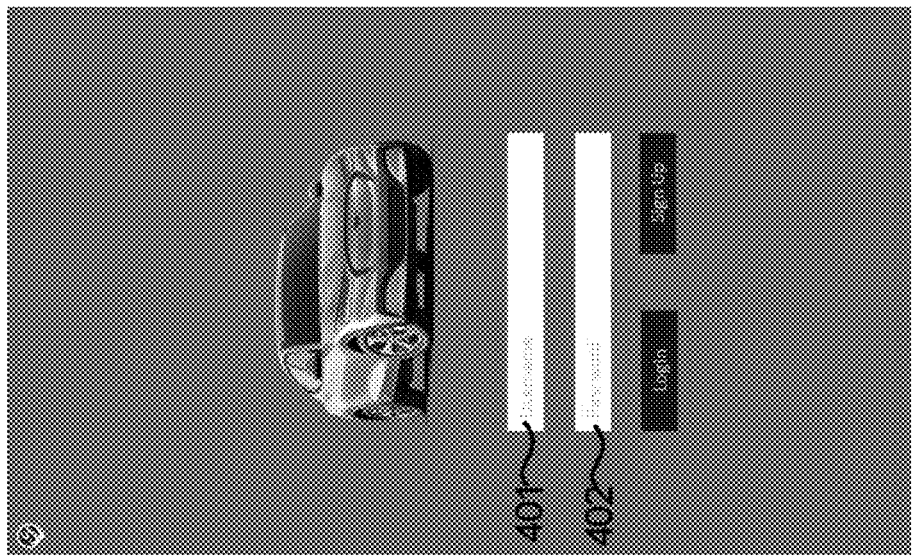
FIG. 4A
FIG. 4B
FIG. 4C

SYSTEMS AND METHODS FOR RANDOM VEHICLE MOVEMENT FOR VEHICLE SAFETY

BACKGROUND

The risk of auto theft increases when thieves realize that the homeowner is not home. For example, the number of reported auto thefts is typically higher on holidays as compared to the national average. Additionally, vehicles parked for a longer amount of time may face issues of battery drain and tire pressure lowering. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 4A-4H illustrate some examples of an exemplary vehicle movement management application in accordance with the principles of the present disclosure.

DETAILED DESCRIPTION

Overview

Figure 1:
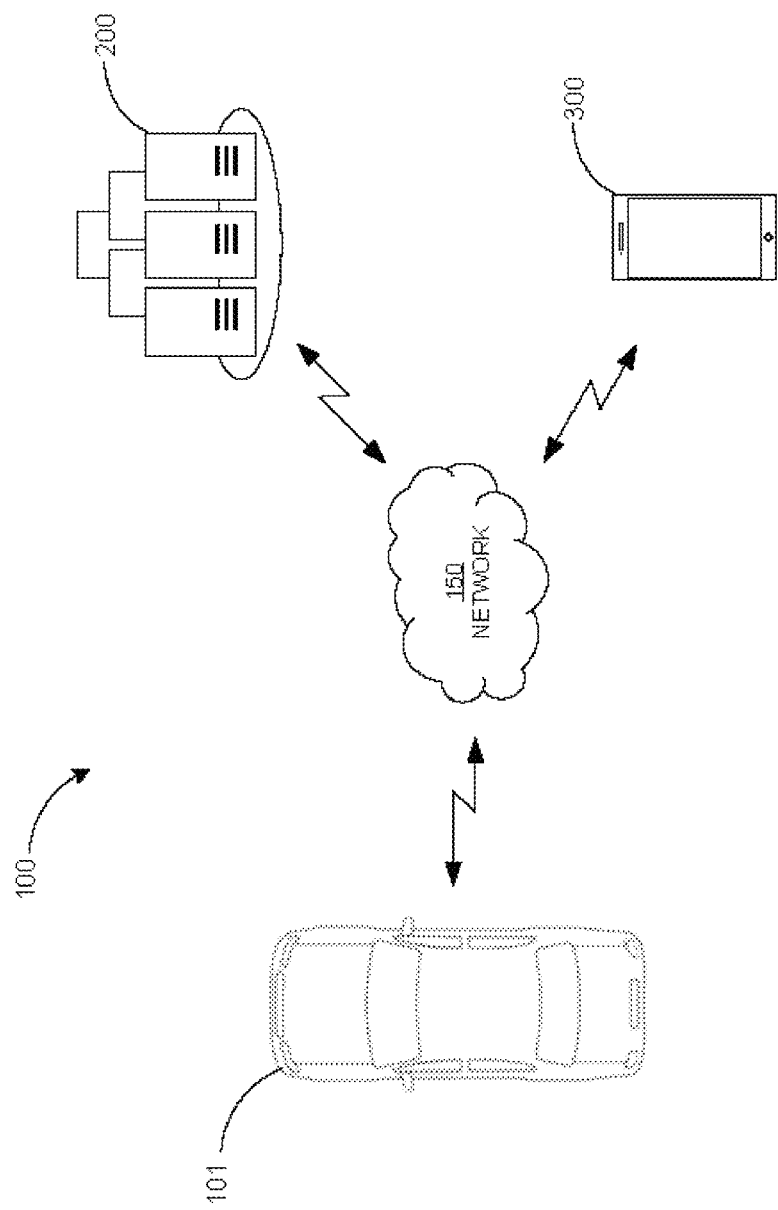
FIG. 1 illustrates a system for random vehicle movement in accordance with the principles of the present disclosure.

Disclosed is a vehicle system that automatically repositions a vehicle, e.g., an autonomous vehicle (AV), at a user's home to improve security, e.g., by making it seem like the user is home. The system may also reduce battery drain and flat spots on the tire. The system includes a controller that may randomize the start time based on the preferences of the user, e.g., daily, weekly, etc. At the decided time, which may be random, the AV may start up on its own and reposition itself. This may involve opening of the garage door, the AV moving out and driving itself in a geofenced area, and returning, e.g., parking itself.

The solution may include two steps. First, the user may configure the system using, e.g., a mobile phone application, paired with the vehicle. The user may also configure the system using a human machine interface (HMI) within the vehicle. For example, an away mode may trigger the system when the user is away from the home. The user also may be able to indicate specific times in the future when they will be away from the home. Another setting may allow the vehicle to learn different patterns of movement in and around the geofenced area as set in the configuration from driver behavior. The machine learning algorithm for learning vehicle patterns may learn the times, location, and the area where the vehicle is usually parked/drives at. The user further may set the time via the mobile phone application for when the vehicle may learn these behaviors. The learned patterns may then be used to self-start, move around, and park the vehicle at random times when the away mode is selected. When this setting is switched off, the vehicle may still perform other tasks as per configurations selected via the mobile phone application. Second, once the mobile phone application is configured by the user, the vehicle may begin performing the tasks at particular times based on the application configuration. The system also may involve the vehicle performing maintenance-related tasks, such as, for example, heating an interior or starting windshield wipers.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, random vehicle movement system 100 is described. System 100 may include vehicle 101 and mobile device 300, communicatively coupled to vehicle movement platform 200 via, e.g., network 150. Vehicle movement platform 200 may be located on one or more servers, and/or embedded in the vehicle control system. Mobile device 300 may be, for example, a smartphone, a tablet, or a smartwatch.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, vehicle movement platform 200 may be configured and/or programmed to operate with a vehicle having a Level-4 or Level-5 autonomous vehicle controller.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or a vehicle-to-everything (V2X) communication.

Figure 2:
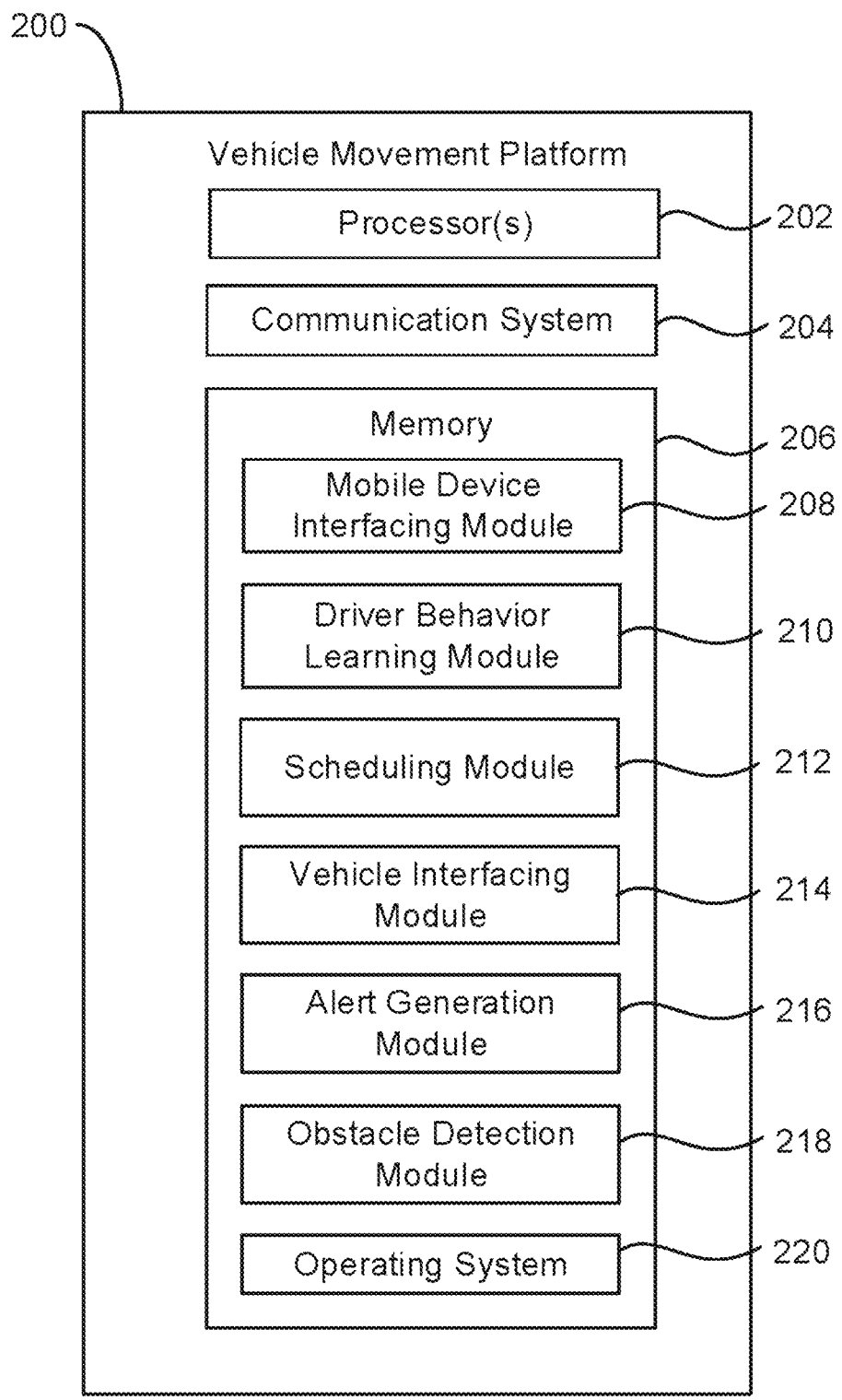
FIG. 2 shows some example components that may be included in a vehicle movement platform in accordance with the principles of the present disclosure.

Referring now to FIG. 2, components that may be included in vehicle movement platform 200 are described in further detail. Vehicle movement platform 200 may include one or more processors 202, communication system 204, and memory 206. Communication system 204 may include a wireless transceiver that allows vehicle movement platform 200 to communicate with vehicle 101 and mobile device 300. The wireless transceiver may use any of various communication formats, such as, for example, an Internet communications format, or a cellular communications format.

Memory 206, which is one example of a non-transitory computer-readable medium, may be used to store operating system (OS) 220, mobile device interfacing module 208, driver behavior learning module 210, scheduling module 212, vehicle interfacing module 214, alert generation module 216, and obstacle detection module 218. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Mobile device interfacing module 208 may be executed by processor 202 for interfacing with a mobile application running on mobile device 300. For example, mobile device interfacing module 208 may receive user input from mobile device 300 regarding application configuration settings, such as vehicle movement window, learning window, driver behavior learning mode, and/or maintenance commands, e.g., heat the interior of vehicle 101 and/or use the windshield wipers of vehicle 101. A vehicle movement window is a time period during which vehicle 101 may perform one or more vehicle events, as described in further detail below, and which may be set by the user. In addition, mobile device interfacing module 208 may transmit alerts to mobile device 300, e.g., to alert the user of mobile device 300 regarding a vehicle event, as described in further detail below.

Driver behavior learning module 210 may be executed by processor 202 for learning a driving behavior pattern of vehicle 101 via machine learning based on driving behavior associated with vehicle 101, e.g., by a driver of vehicle 101, responsive to an actuation command to enter a driver behavior learning mode received from mobile device 300 via mobile device interfacing module 208. Accordingly, in driver behavior learning mode, driver behavior learning module 210 may learn a driving behavior pattern of vehicle 101 based on the driving time, driving location, and/or driving area, e.g., the time vehicle 101 is moved, the area in which vehicle 101 generally moves, and the location where vehicle parks, e.g., at home. For example, driver behavior learning module 210 may learn that vehicle 101 is usually driven from the home to a school and back in the morning and in the afternoon on weekdays.

Scheduling module 212 may be executed by processor 202 for determining a vehicle movement window and/or a learning window based on the user input received from mobile device 300 via mobile device interfacing module 208. For example, if mobile device interfacing module 208 receives an actuation command from mobile device 300 indicating that the user is not home, e.g., "away" mode, scheduling module 212 will initiate the vehicle movement window. Additionally or alternatively, if mobile device interfacing module 208 receives an actuation command from mobile device 300 indicating that the user will not be home for a predetermined time period in the future, e.g., "future away" mode, scheduling module 212 will schedule the vehicle movement window to begin and end during the predetermined time period.

Vehicle interfacing module 214 may be executed by processor 202 for interfacing with vehicle 101. For example, vehicle interfacing module 214 may instruct vehicle 101 to perform a vehicle event during the vehicle movement window determined by scheduling module 212. A vehicle event may include, e.g., repositioning vehicle 101, performing vehicle movement, e.g., driving along a route based on the learned driver behavior pattern of vehicle 101 or driving along a random or predetermined route, and/or performing a maintenance, e.g., heating the interior of vehicle 101 and/or using the windshield wipers of vehicle 101. Vehicle interfacing module 214 may determine a vehicle event is warranted based on user input received from mobile device 300 via mobile device interfacing module 208, and will instruct vehicle 101 to perform the vehicle event within the vehicle movement window. Vehicle interfacing module 214 may instruct vehicle 101 to perform the vehicle movement at a predetermined time within the vehicle movement window, or at a randomized time during the vehicle movement window. Moreover, vehicle interfacing module 214 may instruct vehicle 101 perform the vehicle movement within a predetermined geofence, e.g., about the home of the user.

Alert generation module 216 may be executed by processor 202 for generating an alert based on an executed vehicle event, and transmitting the alert to mobile device 300. For example, alert generation module 216 may alert the user of mobile device 300 after each vehicle event is performed by vehicle 101 such that the user may be updated in real time.

Obstacle detection module 218 may be executed by processor 202 for receiving information from vehicle 101, e.g., via onboard cameras and/or sensors, indicative of an obstacle observed during vehicle movement of vehicle 101 within the vehicle movement window, thus preventing vehicle 101 from completing the vehicle movement. Upon detection of the obstacle by obstacle detection module 218, vehicle 101 may be instructed by vehicle interfacing module 214 to cease the vehicle movement and return to the origin point of the vehicle movement, e.g., the home, if the obstacle may not be overcome safely. Alert generation module 216 may alert the user of mobile device 300 upon detection of the obstacle.

Figure 3:
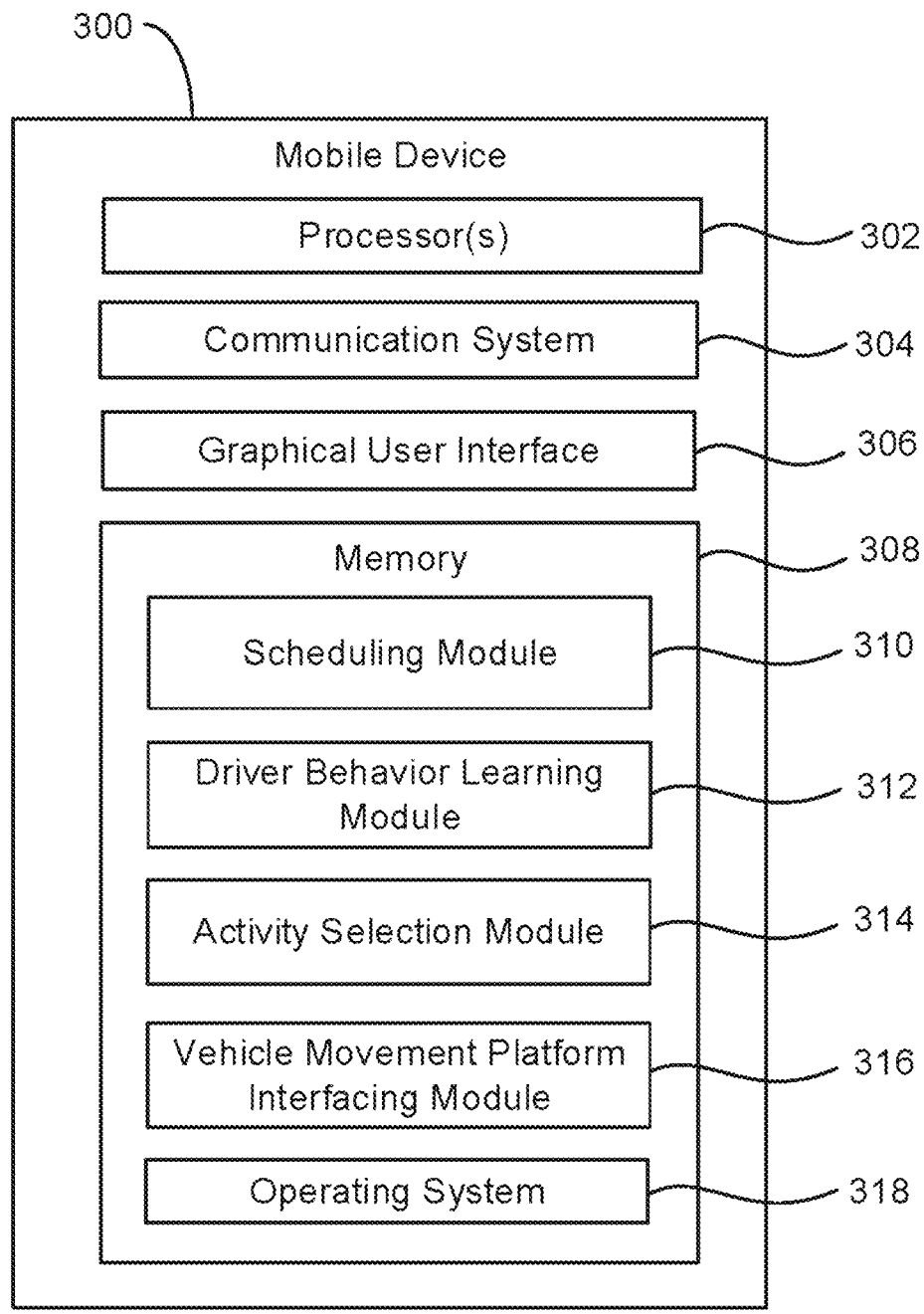
FIG. 3 shows some example components that may be included in a mobile device in accordance with the principles of the present disclosure.

Referring now to FIG. 3, components that may be included in mobile device 300 are described in further detail. Mobile device 300 may include one or more processors 302, communication system 304, graphical user interface (GUI) 306, and memory 308. Communication system 304 may include a wireless transceiver that allows mobile device 300 to communicate with vehicle movement platform 200. The wireless transceiver may use any of various communication formats, such as, for example, an Internet communications format, or a cellular communications format.

Memory 308, which is one example of a non-transitory computer-readable medium, may be used to store operating system (OS) 318, scheduling module 310, driver behavior learning model 312, activity selection module 314, and vehicle movement platform interfacing module 316. The modules are provided in the form of computer-executable instructions that may be executed by processor 302 for performing various operations in accordance with the disclosure.

Scheduling module 310 may be executed by processor 302 for receiving user input via graphical user interface 306 from a user indicative of a vehicle movement window. For example, the user may select an "away" mode, indicating that the user is not home. Thus, the movement window may begin when the "away" mode is selected and continue until the user switches off the "away" mode. Additionally or alternatively, the user may select a "future away" mode with a selectable start and stop time, indicating that the user will not be home between the start and stop time.

Driver behavior learning model 312 may be executed by processor 302 for receiving user input via graphical user interface 306 from a user indicative of a learning mode. For example, the user may select a "learning" mode, such that vehicle movement platform 200 may learn a driving behavior pattern of vehicle 101 via machine learning based on driving behavior associated with vehicle 101, e.g., by a driver of vehicle 101, during the vehicle movement window. In addition, driver behavior learning model 312 may receive user input indicative of a learning window from the user, such that vehicle movement platform 200 may only learn a driving behavior pattern of vehicle 101 during the learning window within the vehicle movement window.

Activity selection module 314 may be executed by processor 302 for receiving user input via graphical user interface 306 from a user indicative of one or more vehicle events, e.g., repositioning vehicle 101, performing vehicle movement, e.g., driving along a random or predetermined route, and/or performing a maintenance, e.g., heating the interior of vehicle 101 and/or using the windshield wipers of vehicle 101. Thus, the user may choose which, if any, vehicle events vehicle movement platform 200 will cause vehicle 101 to perform during the vehicle movement window.

Vehicle movement platform interfacing module 316 may be executed by processor 302 for interfacing with mobile device interfacing module 208 of vehicle movement platform 200 as described above.

Figures 4D, 4E, 4F:
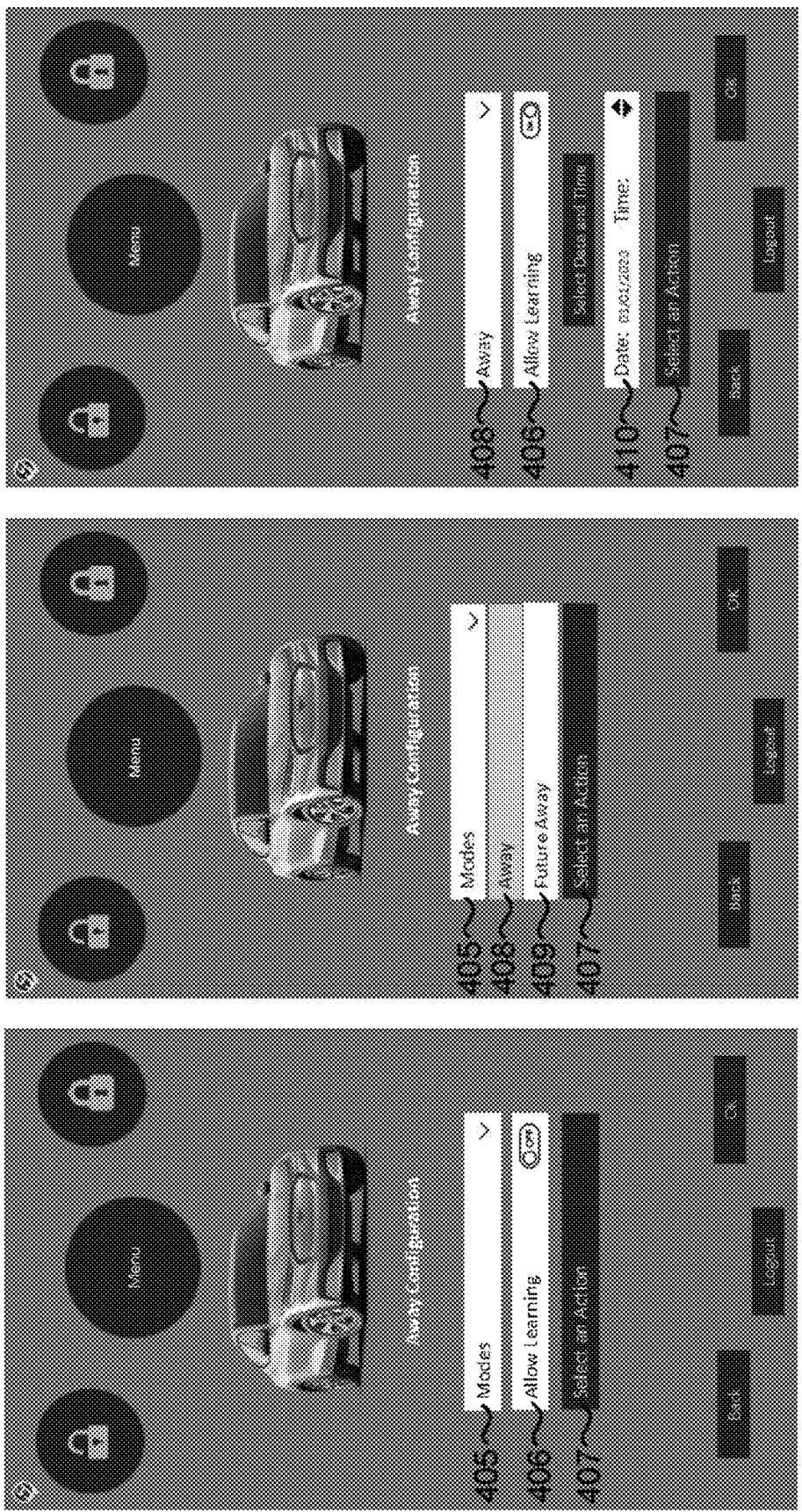

Referring now to FIGS. 4A-4H, some examples of a vehicle movement management application configured to run on mobile device 300 are provided. For example, FIG. 4A illustrates an exemplary login screen of the application, where the user may be required to input username 401 and password 402 to access their account. FIG. 4B illustrates an exemplary home screen of the user's account, where the user may view information such as vehicle data, and select menu 403. FIG. 4C illustrates an exemplary menu screen, where the user may select from a variety of options including, e.g., "away configuration 404," where the user may toggle application configuration settings.

FIG. 4D illustrates some exemplary options that may be available to the user in the "away configuration" screen. For example, the user may select between "modes 405," select to "allow learning 406," which would permit driver behavior learning module 210 to learn a driving behavior pattern of vehicle 101, and/or select one or more actions 407 for vehicle 101 to perform during the vehicle movement window. As shown, in FIG. 4E, the user may select between "away" mode 408 and "future away" mode 409. As shown in FIG. 4F, if the user selects "away" mode 408, and selects to "allow learning 406," the user may then select a time during the vehicle movement window while the user is "away" to implement the learned behavior, e.g., the learning window 410. As shown in FIG. 4G, if the user selects "future away" mode 409, the user may select date and duration 411 that the user plans to be away and whether to "allow learning 406".

Figure 4H:
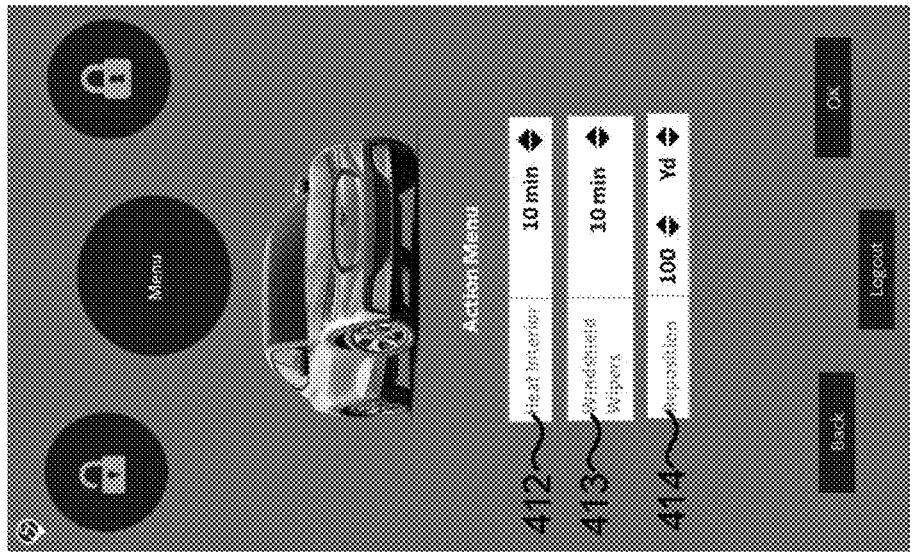
Figure 4G:
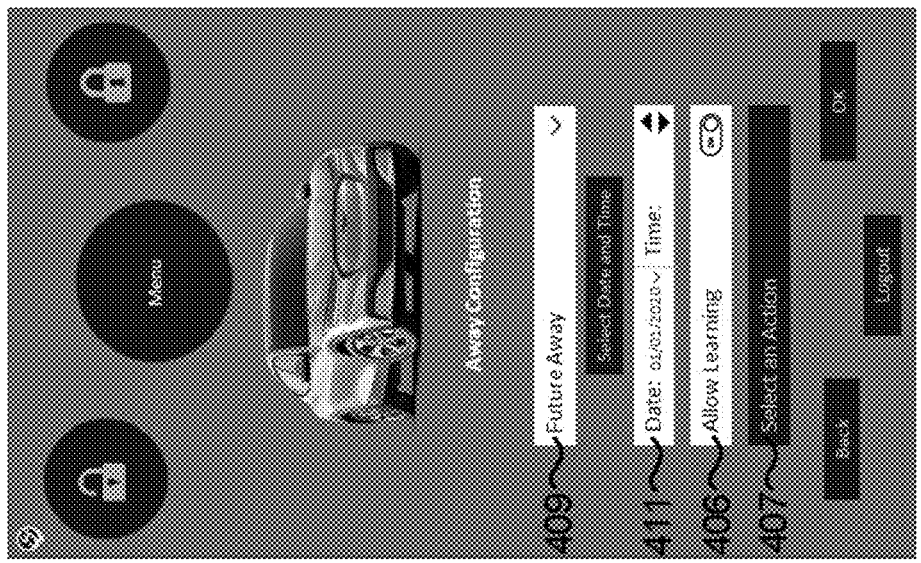

FIG. 4H illustrates vehicle event options available to the user in an exemplary action menu. For example, the user may select "heat interior 412" and specify a duration the user would like vehicle 101 to heat the interior of vehicle 101 during the vehicle movement window. In addition, the user may select "windshield wipers 413" and specify a duration the user would like vehicle 101 to use the windshield wipers of vehicle 101 during the vehicle movement window. Moreover, the user may select "reposition 414" and specify a distance that the user would like vehicle 101 to reposition/move itself during the vehicle movement window.

Figure 5:
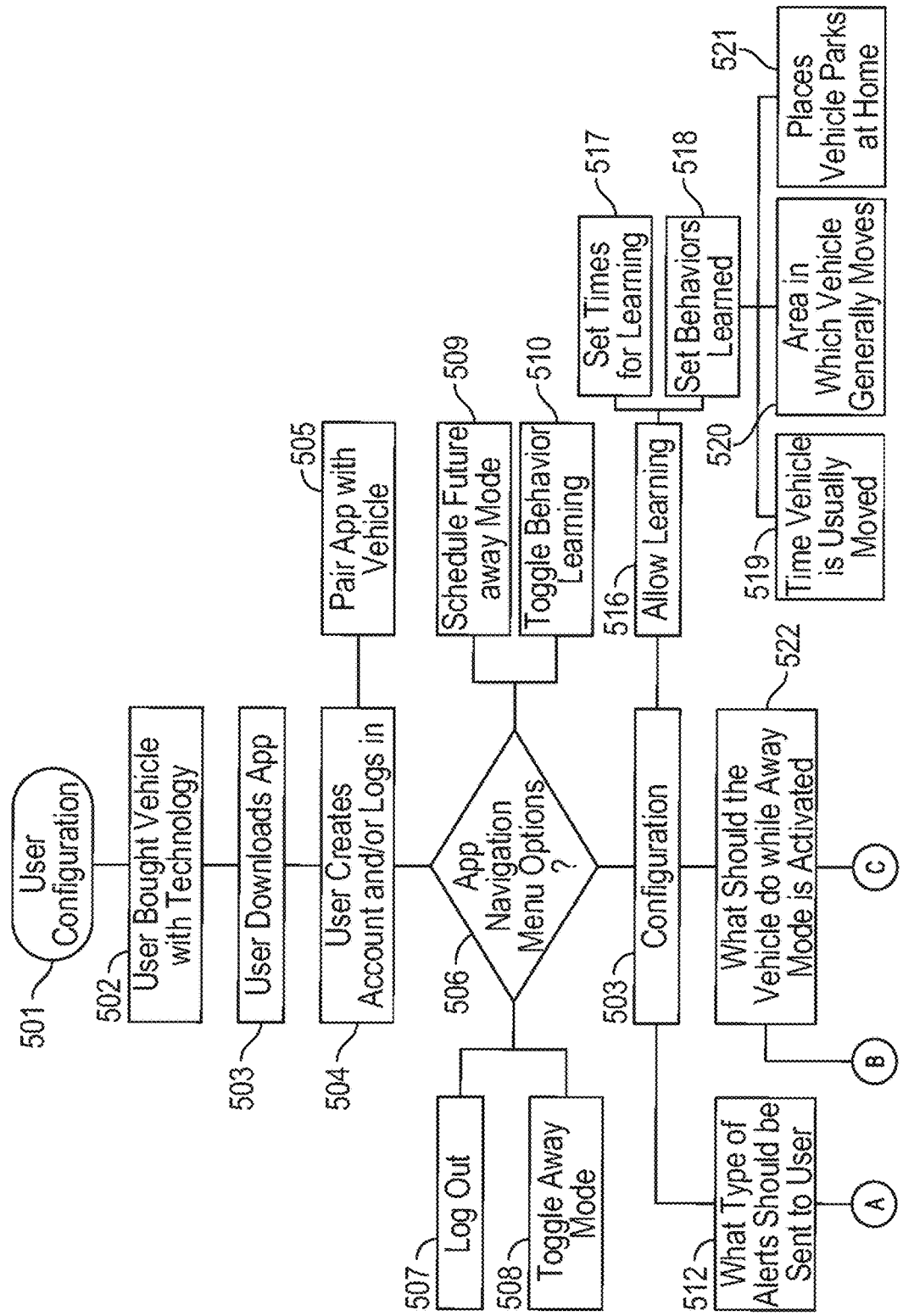
FIG. 5 is a flow chart illustrating exemplary steps for vehicle movement management via the mobile device of FIG. 3 in accordance with the principles of the present disclosure.
Figure 5:
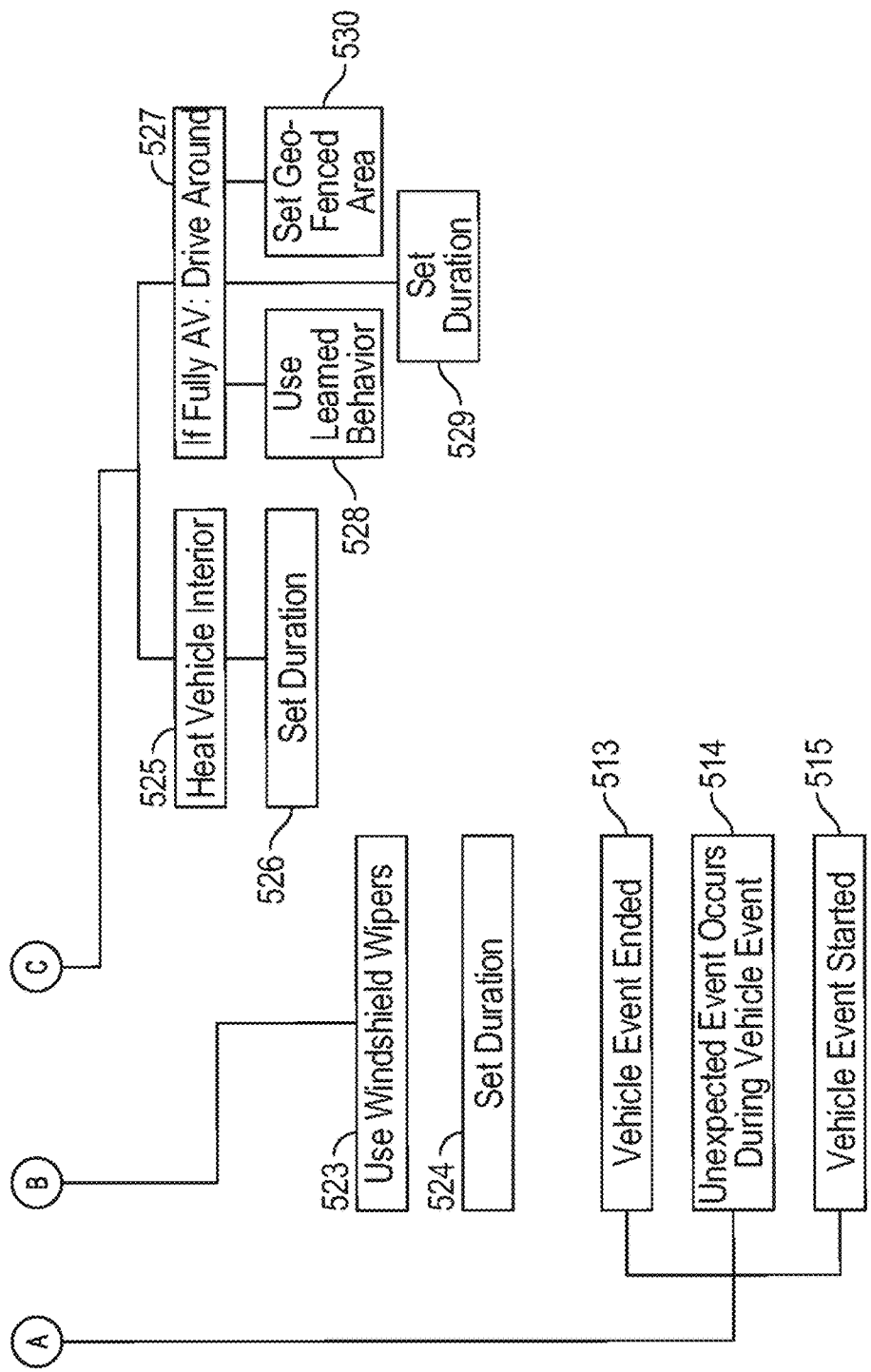

FIG. 5 is a flow chart illustrating exemplary steps for vehicle movement management via the mobile application running on mobile device 300. For example, in order to perform user configuration of system 100 (501), the user may purchase vehicle 101 that is compatible and/or integrated with vehicle movement platform 200 (502). The user may download the mobile application on mobile device 300 (503), create a login account (504), and pair mobile device 300 with vehicle 101 (505). The user may navigate through the mobile application and select menu options (506). The user may, at any time, logout (507), or toggle "away" mode (508), as described above. Alternatively, the user may schedule "future" away (509), and select whether to "allow learning" (510) as described above. The user may configure the application setting (511).

For example, the user further may select which types of alerts to receive (512), such as when a vehicle event ends (513), when an unexpected obstacle is observed by vehicle 101 (514), and/or when a vehicle event starts (515). The user may select to "allow learning," (516) and select what time for learning (517), and which types of behavior to be learned of vehicle 101 (518), e.g., the time vehicle 101 is usually moved (519), the area in which vehicle 101 generally moves (520), and the location where vehicle parks, e.g., at home, (521).

Moreover, the user may select which vehicle events for vehicle 101 to perform while in "away" mode (522), e.g., using windshield wipers (523) and the duration thereof (524), heating the interior of vehicle 101 (525) and the duration thereof (526), and/or reposition/driving vehicle 101 and which type of route to follow. For example, if vehicle 101 is a fully autonomous vehicle, the user may select to have vehicle drive around (527) and select, e.g., whether to use the learned behavior (528), the duration of the drive (529), and/or the predetermined geofence (530).

Figure 6:
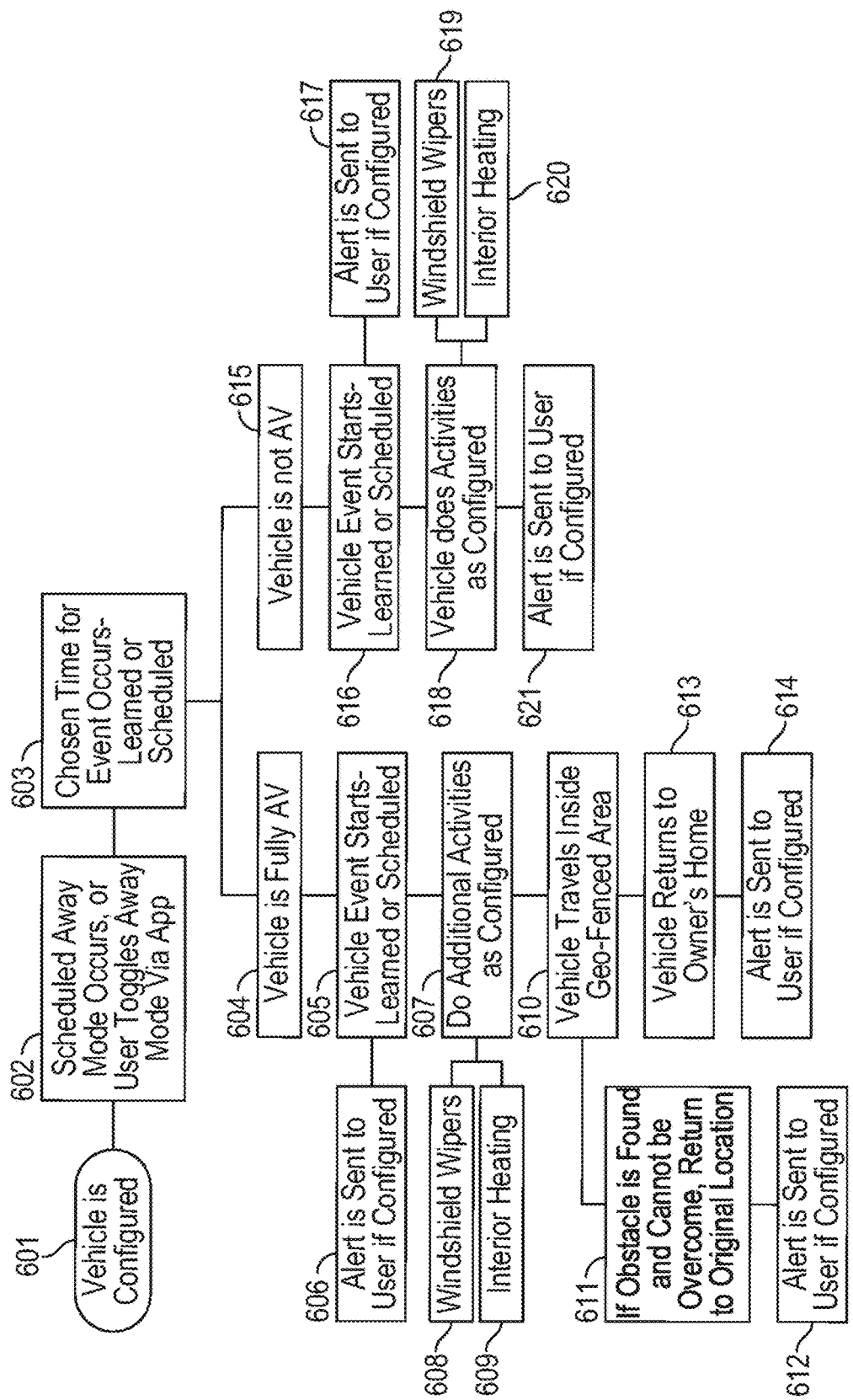
FIG. 6 is a flow chart illustrating exemplary steps for vehicle movement management via the vehicle movement platform of FIG. 2 in accordance with the principles of the present disclosure.

FIG. 6 is a flow chart illustrating exemplary steps for vehicle movement management via vehicle movement platform 200. For example, vehicle 101 may be configured (601), such that vehicle movement platform 200 may schedule "away" mode (602) in accordance with the selected time, schedule, and/or whether learning is allowed (603).

Once vehicle 101 settings are configured, e.g., via mobile device 300, vehicle 101 may perform the vehicle events during the vehicle movement window. If vehicle 101 is fully autonomous (604), vehicle 101 may perform selected vehicle events, e.g., learned or scheduled (605), and an alert may be sent to mobile device 300 (606), if so configured. Vehicle 101 may perform additional vehicle events (607), such as using the windshield wipers (608) and/or heating the interior of vehicle 101 (609). Vehicle 101 may drive automatically and remain within a predetermined geofence (610). If an obstacle is observed by vehicle 101 (611), and the obstacle may not be overcome, an alert may be sent to mobile device 300 (612), if so configured, and vehicle 101 may return to a point of origin, e.g., home (613). Another alert may be sent to mobile device 300 (613), if so configured.

If vehicle 101 is not fully autonomous (615), vehicle 101 may begin a vehicle event (616), and an alert may be sent to mobile device 300 (617), if so configured. For example, vehicle 101 may perform selected vehicle events (618), such as using the windshield wipers (619) and/or heating the interior of vehicle 101 (620). Vehicle 101 may send an alert to mobile device 300 after each vehicle event (621), if so configured.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for random vehicle movement, the system comprising:
   a memory that stores computer-executable instructions; and
   a processor configured to access the memory and execute the computer-executable instructions to:
      receive an actuation command from a mobile device indicating that a user is not home;
      receive a vehicle movement window in the actuation command;
      learn a driving behavior pattern of a vehicle via machine learning based on driving behavior associated with the vehicle;
      open a garage door responsive to the actuation command;
      instruct the vehicle to perform vehicle movement at random times within the vehicle movement window based on the learned driving behavior pattern, such that the vehicle self-starts, moves out, with respect to the garage door, drives itself, and returns, with respect to the garage door so that it can park itself without a driver being located in the vehicle;
      generate an alert when the vehicle performs the vehicle movement; and
      transmit the alert to the mobile device so that the user of the mobile device is updated in real time about the vehicle movement.

2. The system of claim 1, wherein the processor is configured to instruct the vehicle to perform the vehicle movement within a predetermined geofence.

3. The system of claim 1, wherein the vehicle movement window comprises a present start time and a future end time each determined by preferences of a user, such that the processor is configured to receive the present start time at a first time and the future end time at a second time later than the first time.

4. The system of claim 1, wherein the vehicle movement window comprises a future start time and a future end time each determined by periodic preferences of a user.

5. The system of claim 1, wherein the driving behavior comprises at least one of driving time, driving location, or driving area.

6. The system of claim 1, wherein the processor is further configured to receive a learning window from the mobile device, and wherein the processor is configured to learn the driving behavior pattern of the vehicle within the learning window.

7. The system of claim 1, wherein the processor is further configured to:
   receive a reposition command from the mobile device; and
   instruct the vehicle reposition itself within the vehicle movement window.

8. The system of claim 3, wherein the processor is further configured to:
   receive information indicative of an obstacle from the vehicle; and
   instruct the vehicle to return to an origin point of the vehicle movement in response to the obstacle.

9. The system of claim 8, wherein the alert is a first alert, and wherein the processor is further configured to:
   generate a second alert based on the information indicative of the obstacle; and
   transmit the second alert to a mobile device, the second alert being a different type of alert than the first alert.

10. The system of claim 1, wherein the processor is further configured to:
- receive a maintenance command from the mobile device; and
- instruct the vehicle to perform a maintenance based on the maintenance command within the vehicle movement window.

11. The system of claim 10, wherein the maintenance command comprises heating an interior of the vehicle, and wherein the processor is configured to instruct the vehicle to heat the interior of the vehicle within the vehicle movement window.

12. The system of claim 11, wherein the alert is a first alert, and wherein the processor is further configured to:
- generate a second alert when the vehicle heats the interior of the vehicle, the second alert being a different type of alert than the first alert; and
- transmit the second alert to the mobile device.

13. The system of claim 12, wherein the maintenance command comprises using a windshield wiper of the vehicle, and wherein the processor is configured to instruct the vehicle to use the windshield wiper of the vehicle within the vehicle movement window.

14. The system of claim 13, wherein the processor is further configured to:
- generate a third alert when the vehicle uses the windshield wiper of the vehicle, the third alert being a different type of alert than the first and second alerts; and
- transmit the third alert to the mobile device.

15. A method for random vehicle movement, the method comprising:
- receiving an actuation command from a mobile device indicating that a user is not home;
- receiving a vehicle movement window in the actuation command;
- learning a driving behavior pattern of a vehicle via machine learning based on driving behavior associated with the vehicle;
- opening a garage door responsive to the actuation command;
- instructing the vehicle to perform vehicle movement at random times within the vehicle movement window based on the learned driving behavior pattern, such that the vehicle self-starts, moves out, with respect to the garage door, drives itself, and returns, with respect to the garage door so that it can park itself without a driver being located in the vehicle;
- generating an alert when the vehicle performs the vehicle movement; and
- transmitting the alert to the mobile device so that the user of the mobile device is updated in real time about the vehicle movement.

16. The method of claim 15, further comprising:
- receiving a maintenance command from the mobile device; and
- instructing the vehicle to perform a maintenance based on the maintenance command within the vehicle movement window.

17. The method of claim 15, further comprising:
- receiving information indicative of an obstacle from the vehicle; and
- instructing the vehicle to return to an origin point of the vehicle movement in response to the obstacle.

* * * * *